Feb. 23, 1926.  1,574,236
G. DUFFING
APPARATUS FOR LUBRICATING THE AXLE BEARINGS OF VEHICLES AND THE LIKE
Filed June 5, 1924   3 Sheets-Sheet 1
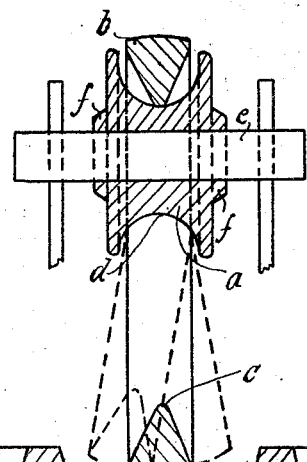
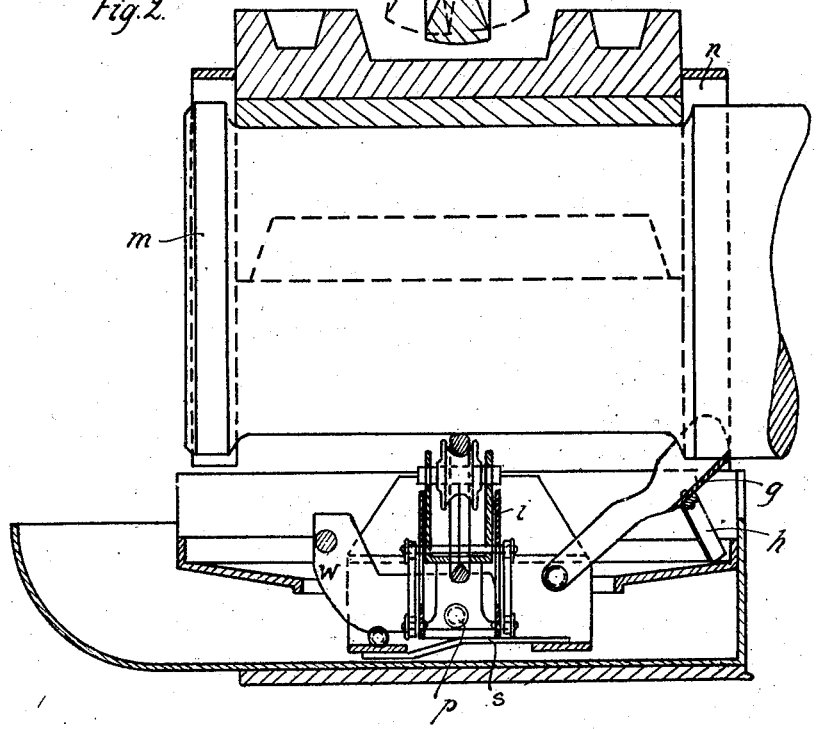
Inventor
G. Duffing
By Marks Clerk
Attys.

Feb. 23, 1926. 1,574,236
G. DUFFING
APPARATUS FOR LUBRICATING THE AXLE BEARINGS OF VEHICLES AND THE LIKE
Filed June 5, 1924  3 Sheets-Sheet 3
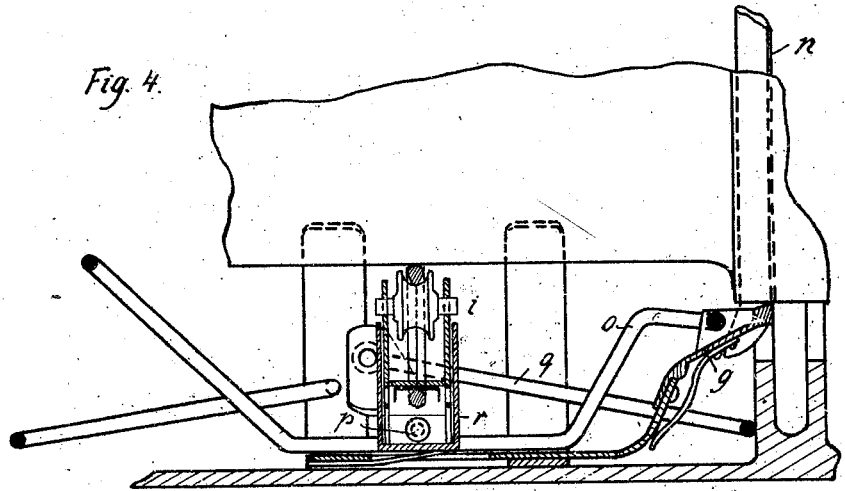
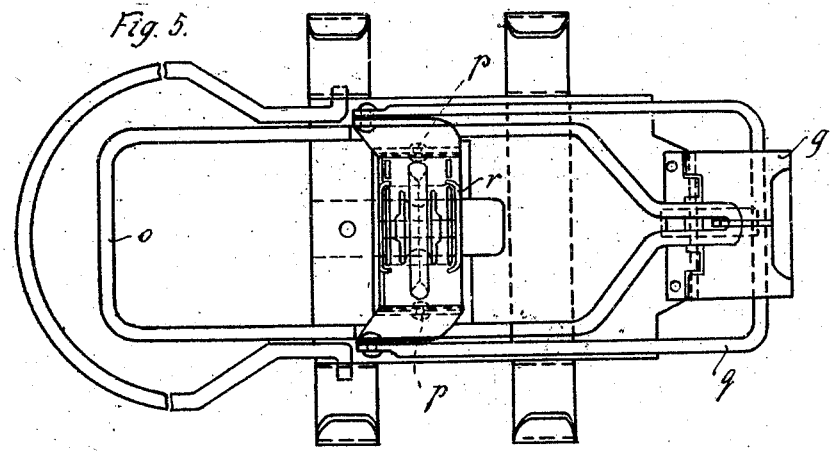
Inventor
G. Duffing
By Marks Clark
Attys Patented Feb. 23, 1926.

1,574,236

UNITED STATES PATENT OFFICE.

GEORG DUFFING, OF HAMBURG, GERMANY.

APPARATUS FOR LUBRICATING THE AXLE BEARINGS OF VEHICLES AND THE LIKE.

Application filed June 5, 1924. Serial No. 718,118.

*To all whom it may concern:*

Be it known that I, GEORG DUFFING, citizen of the German State, residing at Hamburg, Germany, have invented certain new and useful Improvements in Apparatus for Lubricating the Axle Bearings of Vehicles and the like, of which the following is a specification.

This invention relates to lubricating apparatus for bearings wherein the lower bearing step is either absent or does not take any load, and more particularly to lubricating apparatus for the axle bearings of vehicles such as railway vehicles, tramway vehicles, steam locomotives, electric locomotives and the like. In lubricating apparatuses of this kind it has already been proposed to employ a suspended ring which dips into the lubricant and is pressed against the axle journal and is actuated by the rotation of the latter in such a manner as to carry the lubricant by adhesion up to the journal surface from a lubricant container, located below the journal.

The present invention has now for its object to provide an improved manner of suspension of the aforesaid ring and by the use of other suitable means to effect the delivery of the lubricant in excess to the surface of the journal so that the lubricant is distributed uniformly over the entire surface of the journal, and the lubricant running off the journal is returned in an improved manner back into the lubricant container. This improved return of the lubricant is of particular importance because in the case of a rapid delivery of the lubricant by means of the suspending lubricating ring the lubricant container might possibly become emptied very soon, with the consequent risk of the bearings becoming heated.

The ring is suspended on a vertically and horizontally movable roller. The inner periphery of the ring has the shape of a rounded knife edge, and consequently its running surface is convex on its underside. The roller has a concave bearing periphery so that in axial section it has the form of a disc in which the rounded knife edge of the cross sectional form of the ring is suspended loosely. The roller is arranged on its vertical movable axle in such a manner that it is capable of sliding to and fro to a laterally limited extent. The cross sectional shape of the ring and the roller and the manner of suspending the said ring afford great freedom of movement to the ring, so that thereby a very great range of pendulating motion of the said ring is provided for in working which enables the ring to achieve the highest volumes of delivery even in cases where the delivery would otherwise be rendered difficult owing to the viscous nature of the lubricant.

For the purpose of assuring freedom of motion of the roller on the vertically movable axle the said roller may be provided at both ends with rounded and tapering extensions so that the contact surface between the roller and the lateral limit of the bearing of the roller axle is diminished. This diminution of the contact surface between the roller and the lateral limit of the roller axle bearing may also be produced by providing the lateral parts of the roller bearing with rounded and tapering extensions. Both ends of the roller and also the lateral portions of the bearing may also be similarly rounded and tapered.

The mobility of the roller axle in the vertical direction is produced most simply by mounting the roller axle, and with it the roller, in a vertically movable resilient frame. The great freedom and range of the pendulating motion of the ring in working in combination with the constructional shapes of the ring and roller and the manner of suspension of the ring, assure also the delivery of the lubricant in excess and a good distribution of the latter by centrifugal action. Special devices may be provided for returning the lubrication that runs off, and a description of these devices is incorporated in the following description of some constructional forms of the improved lubricating apparatus which are illustrated by way of example in Figures 1 to 5 of the accompanying drawings.

Fig. 1 is a detail view of the lubricating ring as mounted on the roller.

Referring first to Figure 1: $a$ is the roller, and $b$ is the ring suspended on said roller, $c$ is the inner periphery of the ring; it has the form of a rounded knife-edge. $d$ is the concave outer periphery of the roller $a$. The combination of the knife-edge $c$ and concave periphery allow the ring to have a pendulating motion in both lateral directions. The roller $a$ is free to slide to-and-fro along its axle $e$ within certain lateral limits. This motion in combination with the lateral pendulating motion of the ring $b$ gives to the ring $b$ complete freedom of varying within determined limits its position relatively to the axle journal to be lubricated. The roller $d$ has tapering rounded extensions or bosses $f$ on both sides.

Figures 2 and 3 illustrate a constructional form of the improved lubricating apparatus provided with auxiliary means in the form of impact members or crank drives, for the purpose of locating the lubricating ring automatically in its place when assemblying the parts. A spring is provided underneath the guide frame for the purpose of assuring the proper location of the lubricating ring in its operative position.

Figure 2 is a longitudinal section, and

Figure 3:
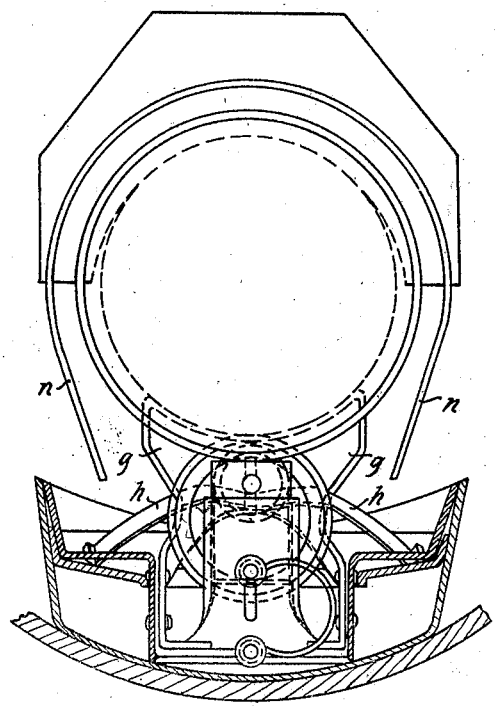
Figure 3 is an end view of the improved arrangement.

In placing the improved apparatus into position the scraper $g$ is pushed down in opposition to the spring $h$ so that said scraper is thereby located under the thick part of the axle. The frame $i$ (shown in operative position) is pivoted on pins $p$ and together with the lubricating ring is turned down through approximately 90° to the right referring to Figure 2 so that in slipping the apparatus into place, the stop $w$ comes against the journal shoulder $m$ and, as the apparatus is pushed in further, it automatically moves the ring together with the frame $i$ into operative position. The oil catchers $n$ are constructed in the form of sheet metal rings open at the bottom which are attached to the bearing step or brass.

Figures 4 and 5 illustrate a constructional form of the improved lubricating apparatus wherein the lubricant flowing along the axle is returned into the lubricant container by a suitably shaped scraper.

Figure 4 is a longitudinal section and Figure 5 is a plan of this apparatus. In this construction the scraper $g$ is pressed down by the bar $o$, and the hinged frame $i$ which is adapted to pivot around the pins $p$, is brought together with the lubricating ring into operative position by the pivoted stirrup $q$ striking against the inner wall of the axle box and, by its movement relative to the frame $i$, it causes the outer or main frame $r$ to turn to the left around the pin $p$.

In addition to the scraper $g$, an oil catcher $n$ is also provided in the lubricant container, by which the lubricant thrown off by the journal is returned into the said container. This apparatus which is illustrated in Figures 4 and 5, is suitable for closed axle boxes that have no inset oil box reservoir.

What I claim is:—

1. In a lubricating apparatus of the type wherein the lubricant is delivered to the surface of the journal by means of a ring dipping in the lubricant, the combination of a vertically and horizontally movable roller with concave bearing periphery, and a delivering ring having a knife-edge inner running surface suspended loosely on the concave bearing periphery of said roller, whereby the greatest possible freedom of movement is afforded to the ring in its work of delivering lubricant.

2. In a lubricating apparatus of the type wherein the lubricant is delivered to the surface of the journal by means of a ring dipping in the lubricant, the combination of a vertically and horizontally movable roller with concave bearing periphery, and a delivering ring having a knife-edge inner running surface suspended loosely on the concave bearing periphery of said roller, a vertically movable bearing member for said roller, a horizontal bearing member for said roller, said roller being slidable along said horizontal bearing member, and a spring pressing upwards against said vertically movable bearing, whereby said ring is actuated by the journal contacting with the said ring.

In testimony whereof I affix my signature.

GEORG DUFFING.